(12) United States Patent
Yoon et al.

(10) Patent No.: US 11,754,664 B1
(45) Date of Patent: Sep. 12, 2023

(54) METHOD FOR ACCESS CONTROL USING REAL-TIME POSITIONING TECHNOLOGY AND THE DEVICE USING THE SAME

(71) Applicant: SUPREMA INC., Seongnam-si (KR)

(72) Inventors: Si Woong Yoon, Gwangju-si (KR); Tae Sung Lee, Gunpo-si (KR); Jae Hyeok Jeong, Gimpo-si (KR); Tae Hoon Lee, Yongin-si (KR)

(73) Assignee: SUPREMA INC., Seongnam-si (KR)

( * ) Notice: Subject to any disclaimer, the term of this patent is extended or adjusted under 35 U.S.C. 154(b) by 0 days.

(21) Appl. No.: 18/083,903

(22) Filed: Dec. 19, 2022

(30) Foreign Application Priority Data

Sep. 16, 2022 (KR) .................. 10-2022-0117349

(51) Int. Cl.
*G01S 5/02* (2010.01)
*H04W 64/00* (2009.01)
*G01S 5/04* (2006.01)

(52) U.S. Cl.
CPC ........ *G01S 5/0295* (2020.05); *G01S 5/02521* (2020.05); *H04W 64/003* (2013.01); *G01S 5/04* (2013.01)

(58) Field of Classification Search
CPC ...... G01S 5/02521; G01S 5/0284; G01S 5/04; G01S 5/14; G01S 5/10; G01S 11/06; G01S 5/0244; G01S 5/0295; H04W 4/029; H04W 64/00; H04W 64/003; H04W 4/33; H04W 64/006
See application file for complete search history.

(56) References Cited

U.S. PATENT DOCUMENTS

| | | | |
|---|---|---|---|
| 10,531,421 B1* | 1/2020 | Osinski | H04W 4/90 |
| 2007/0049291 A1* | 3/2007 | Kim | G01S 19/48 455/456.1 |
| 2013/0324165 A1* | 12/2013 | Fujiwara | H04W 12/06 455/457 |
| 2020/0033439 A1* | 1/2020 | Horgan | G01S 5/0244 |
| 2022/0256310 A1* | 8/2022 | Volkerink | H04W 64/003 |
| 2022/0361141 A1* | 11/2022 | Kumar | H04W 72/23 |

\* cited by examiner

*Primary Examiner* — Olumide Ajibade Akonai
(74) *Attorney, Agent, or Firm* — Maschoff Brennan

(57) ABSTRACT

Disclosed herein are a method for access control using real-time positioning technology and a device using the same. According to a positioning method of a positioning module, the positioning module is configured to measure a location of at least one location-unrecognized device and a location of a terminal, wherein the at least one location-unrecognized device, the terminal and at least one location-recognized device is located in a certain zone, and wherein the positioning module has coordinate information of the at least one location-recognized device and the positioning module has not coordinate information of the at least one location-unrecognized device.

14 Claims, 12 Drawing Sheets

111  211  212  112

213  214  215  216

2000
217  218  219  220

113  221  222  114

METHOD FOR ACCESS CONTROL USING REAL-TIME POSITIONING TECHNOLOGY AND THE DEVICE USING THE SAME

CROSS-REFERENCE TO RELATED APPLICATION

This application claims priority to and the benefit of Korean Patent Application No. 2022-0117349, filed on Sep. 16, 2022, the disclosure of which is incorporated herein by reference in its entirety.

BACKGROUND

1. Field of the Invention

The present invention relates to a method for access control using real-time positioning technology and a device using the same.

2. Discussion of Related Art

In the field of access control, a technology for improving convenience using a terminal is used to manage access to a building or a specific area, payment processing, use of a specific device, etc. According to the technology, the terminal is implemented as a card key or the like, but recently, this technology has been gradually expanding to terminals such as smartphones carried by users or the like.

In the field of access control, finding the accurate location of a terminal may be required to improve security and accuracy. According to the related art, to find the location of a terminal, a plurality of location-recognized devices having coordinate information are installed in a certain zone, and the location of the terminal may be found by a control device (or a server) through communication between the plurality of location-recognized devices and the terminal. In this case, to accurately find the location of the terminal, the control device needs to find accurate locations at which the plurality of location-recognized devices are disposed. Unless the locations at which the plurality of location-recognized devices are disposed are found, the location of the terminal is not accurately found.

SUMMARY OF THE INVENTION

The present invention is directed to providing a positioning method for accurately finding, even when coordinate information of a location-unrecognized device is unknown, the coordinate information of the location-unrecognized device and coordinate information of a terminal through communication between the terminal and a location-recognized device and communication between the terminal and the location-unrecognized device.

The present invention is directed to providing a control method for accurately finding an intention of a user of a terminal using coordinate information of a location-unrecognized device and coordinate information of the terminal and performing user authentication.

Objectives of the present invention are not limited to those described above, and other objects which have not been described will be clearly understood by those of ordinary skill in the art from the present specification and the accompanying drawings.

According to an aspect of the present invention, there is provided a positioning method of a positioning module for measuring a location of at least one location-unrecognized device and a location of a terminal, wherein the at least one location-unrecognized device, the terminal and at least one location-recognized device is located in a certain zone, and wherein the positioning module has coordinate information of the at least one location-recognized device and the positioning module has not coordinate information of the at least one location-unrecognized device, the positioning method comprising acquiring coordinate information of the terminal which includes coordinate information at a first location, coordinate information at a second location, and coordinate information at a third location, based on signals transmitted and received between the at least one location-recognized device and the terminal, acquiring first distance information between the terminal at the first location and the at least one location-unrecognized device and generating a first virtual circle based on the first distance information, acquiring second distance information between the terminal at the second location and the at least one location-unrecognized device and generating a second virtual circle based on the second distance information, acquiring third distance information between the terminal at the third location and the at least one location-unrecognized device and generating a third virtual circle based on the third distance information, and estimating coordinate information of the at least one location-unrecognized device based on the coordinate information of the terminal, the first virtual circle, the second virtual circle, and the third virtual circle.

Solutions of the present invention are not limited to that described above, and other solutions which have not been described will be clearly understood by those of ordinary skill in the art from the present specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
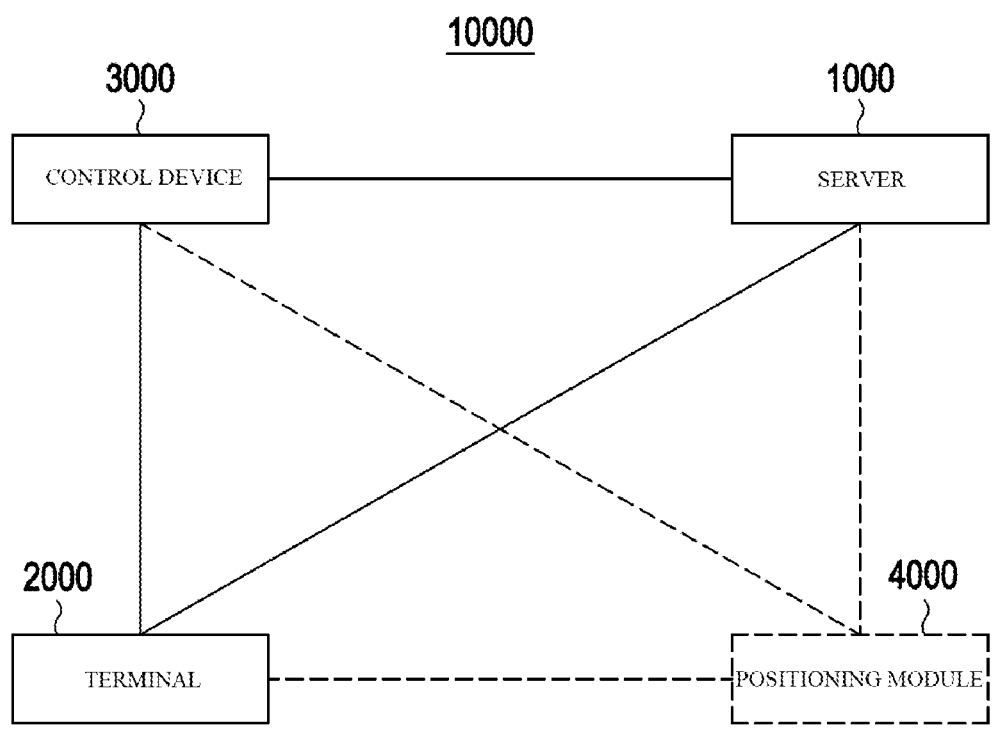
FIG. 1 is a diagram showing an environment of a management system according to an exemplary embodiment.

Exemplary embodiments disclosed in the present specification are for the purpose of clearly describing the spirit of the present invention to those of ordinary skill in the art. Accordingly, the present invention is not limited to the embodiments disclosed herein, and the scope of the present invention should be interpreted to include modified examples or variations without departing from the spirit of the present invention.

As terminology used herein, currently widely used general terms are selected in consideration of functions in the present invention, but the terms may vary depending on the intention of those of ordinary skill in the art, a precedent, or the advent of new technology. Unlike this, when a specific term is defined and used with an arbitrary meaning, the meaning of the term will be particularly stated. Therefore, terms used in this specification should be interpreted based on the actual meaning of the terms and the overall content of the present specification rather than the names thereof.

The drawings attached to the present specification are for facilitating description of the present invention. Since shapes shown in the drawings may be exaggerated as necessary to help understanding of the present invention, the present invention is not limited by the drawings.

In the present specification, when it is deemed that detailed description of a known element or function related to the present invention may obscure the gist of the present invention, the detailed description will be omitted.

Hereinafter, an access management method and an access management device using the same will be described according to an exemplary embodiment of the present invention.

FIG. 1 is a diagram showing an environment of a management system according to an exemplary embodiment.

Referring to FIG. 1, a management system 10000 may include a server 1000, a terminal 2000, and a control device 3000.

The server 1000 may communicate with at least one of the control device 3000 and the terminal 2000 to transmit and receive various kinds of information.

According to an exemplary embodiment, the server 1000 may provide information required for user authentication to at least one of the control device 3000 and the terminal 2000. Here, the user authentication may be authentication of whether a user or terminal has specific authority. For example, user authentication may include authentication of various kinds of authority such as access authority authentication regarding whether the user or terminal has authority to access a specific area, payment authority authentication regarding whether the user or terminal has authority to process payment for a certain service, usage authority authentication regarding whether the user or terminal has authority to use a specific device, operating mode setting authentication regarding whether the user or terminal has authority to set an operating mode of a specific device, etc. Also, the server 1000 may perform the user authentication and provide the authentication result to at least one of the control device 3000 and the terminal 2000. When the user authentication is performed by at least one of the control device 3000 and the terminal 2000, the server 1000 may acquire the result of the user authentication from at least one of the control device 3000 and the terminal 2000.

Further, the server 1000 may perform processing for user authentication. For example, when a request for processing user authentication is received from the terminal 2000 or the control device 3000, the server 1000 may perform the processing in accordance with the user request or may determine whether to perform the processing in accordance with the user request in the terminal 2000 or the control device 3000 and provide the determination result to the terminal 2000 or the control device 3000. Here, processing user authentication may be a follow-up operation that may be performed based on user authentication such as controlling the user's access to a specific area, a payment process of the user, use of a specific device by the user, an operating mode of a specific device, etc. in accordance with the user authentication result.

The terminal 2000 may communicate with at least one of the control device 3000 and the server 1000 to transmit and receive various kinds of information. For example, the terminal 2000 may transmit and receive information required for user authentication with the control device 3000. Also, the terminal 2000 may transmit data required for an access request and/or a setting change request to the control device 3000 and the server 1000. According to an exemplary embodiment, the terminal 2000 may perform the above-described user authentication.

When user authentication is performed, the terminal 2000 may request the control device 3000 or the server 1000 to perform processing of user authentication and acquire a result of the processing request from the control device 3000 or the server 1000. Also, the terminal 2000 may acquire a result of whether processing of user authentication may be performed from the control device 3000 or the server 1000 and perform processing of user authentication based on the result.

An application for performing some exemplary embodiments to be described below may be provided in the terminal 2000.

The terminal 2000 may be implemented as a smartphone, a tablet computer, a personal digital assistant (PDA), a laptop computer, a wearable device, etc. Alternatively, the terminal 2000 may be implemented as a smart card, an integrated chip (IC) card, a magnetic card, a radio frequency (RF) chip, etc. in which data may be recorded.

The control device 3000 may communicate with at least one of the server 1000 and the terminal 2000 to transmit and receive various kinds of information. Also, the control device 3000 may perform various kinds of processing in accordance with the user authentication result. For example, in accordance with the user authentication result, the control device 3000 may control the user's access to a specific area, control a payment process of the user, control use of a specific device by the user, or control an operating mode of a specific device.

As a specific example, when the user's access to a specific area is restricted by a gate, the control device 3000 may control the gate to control the user's access to the specific area in accordance with the user authentication result. Here, the gate is an apparatus that physically restricts the user's access and may include an access control apparatus (e.g., an access bar, an access door, etc.). The control device 300 may control the gate to be in an open state by providing an unlock signal to the gate so that access of the user may be allowed. Also, the control device 3000 may control the gate to be in a closed state by not providing an unlock signal to the gate or providing a lock signal to the gate so that access of the user may be prevented. According to an exemplary embodiment, the control device 300 may be disposed in the gate or near the gate.

When the control device 3000 controls a payment process, the control device 3000 may perform a payment approval procedure. For example, the control device 3000 may receive a payment request from the terminal 2000 and may or may not approve the payment request based on the user authentication result. According to an exemplary embodiment, the payment approval procedure may be performed in the server 1000. In this case, the control device 3000 may transmit the payment request from the terminal 2000 to the server 1000 and receive a payment approval result from the server 1000. Also, the control device 3000 may perform various kinds of control based on the payment approval result. For example, when the control device 3000 controls a gate for access to public transportation, the control device 3000 may control the gate based on the payment approval result. The control device 3000 may provide the payment approval result to at least one of the server 1000 and the terminal 2000. Further, in the case of controlling use of a specific device in accordance with the user authentication result, the control device 3000 may control use of the specific device through software installed in the specific device or by controlling a restriction device which physically restricts use of the specific device, based on the user authentication result.

In the case of controlling an operating mode of a specific device, the control device 3000 may set the operating mode of the specific device based on the user authentication result. For example, when the control device 3000 controls an access control apparatus for managing access to a specific area, the access control apparatus may be controlled in a security mode in which a security level of the specific area is raised or a normal mode in which the security mode is terminated in accordance with the user authentication result. According to an exemplary embodiment, the access control apparatus may be included in the control device 3000.

Such user authentication may also be processed by the server 1000 or the terminal 2000.

According to an exemplary embodiment, the control device 3000 may perform an operation for the above-described user authentication.

When user authentication is performed, the control device 3000 may request the terminal 2000 or the server 1000 to perform processing of user authentication and acquire a result of the processing request from the terminal 2000 or the server 1000. Also, the control device 3000 may acquire a result of whether processing of user authentication may be performed from the terminal 2000 or the server 1000 and perform processing of the user authentication based on the result.

A positioning module 4000 may determine a location of a location-recognized device, a location-unrecognized device, or the terminal 2000. According to an exemplary embodiment, the positioning module 4000 may be included in the server 1000, the terminal 2000, or the control device 3000. According to another exemplary embodiment, the positioning module 4000 may be implemented as a separate device.

The positioning module 4000 may generate or acquire a map for displaying a location of the terminal 2000 in a certain zone and display the location of the terminal 2000 on the map.

According to an exemplary embodiment, a location-recognized device and a location-unrecognized device may be disposed in the certain zone for which user authentication is performed. The location-recognized device may be a device whose coordinate information representing a location of the location-recognized device is determined. Also, the coordinate information may be Global Positioning System (GPS) coordinate information or coordinate information arbitrarily set by the positioning module 4000. The positioning module 4000 may store the location of the location-recognized device in advance or acquire the location of the location-recognized device through communication with the location-recognized device and include the location of the location-recognized device in the map.

Also, the location-unrecognized device may be a device whose location is not determined, that is, a device of which coordinate information is not obtained. The positioning module 4000 may determine a location of the location-unrecognized device and include the location of the location-unrecognized device in the map.

The location-recognized device and location-unrecognized device may communicate with the terminal 2000 using an ultra-wide band (UWB) communication module. For example, a location or distance information of the location-recognized device, the location-unrecognized device, or the terminal 2000 may be determined using a time of flight (ToF) method. As an example, the location or distance information of the location-recognized device, the location-unrecognized device, or the terminal 2000 may be determined using a time difference of arrival (TDoA) method, a phase difference of arrival (PDoA) method, or a two way ranging (TWR) method. For convenience of description, an exemplary embodiment in which the location-recognized device and location-unrecognized device include a UWB communication module will be mainly described. The present invention is not limited thereto, and each of the location-recognized device and location-unrecognized device may include a Bluetooth low energy (BLE), Bluetooth, wireless local area network (WLAN), WiFi, WiFi direct, near field communication (NFC), Infrared Data Association (IrDA), UWB, ZigBee, third generation (3G), fourth generation (4G), or fifth generation (5G) mobile communication module and wired and wireless communication modules that transmit data in accordance with various other communication standards. Each of the location-recognized device and location-unrecognized device may communicate with the terminal 2000 through the wired and wireless communication modules so that the location information or distance information of the location-recognized device, the location-unrecognized device, or the terminal 2000 may be determined. A positioning method for the location-recognized device, the location-unrecognized device, or the terminal 2000 will be described in further detail below.

The environment diagram shown in FIG. 1 is merely an example for convenience of description and the present invention is not limited thereto. According to some embodiments, elements may be added to or removed from the environment diagram of FIG. 1 or may be subdivided.

Figure 2:
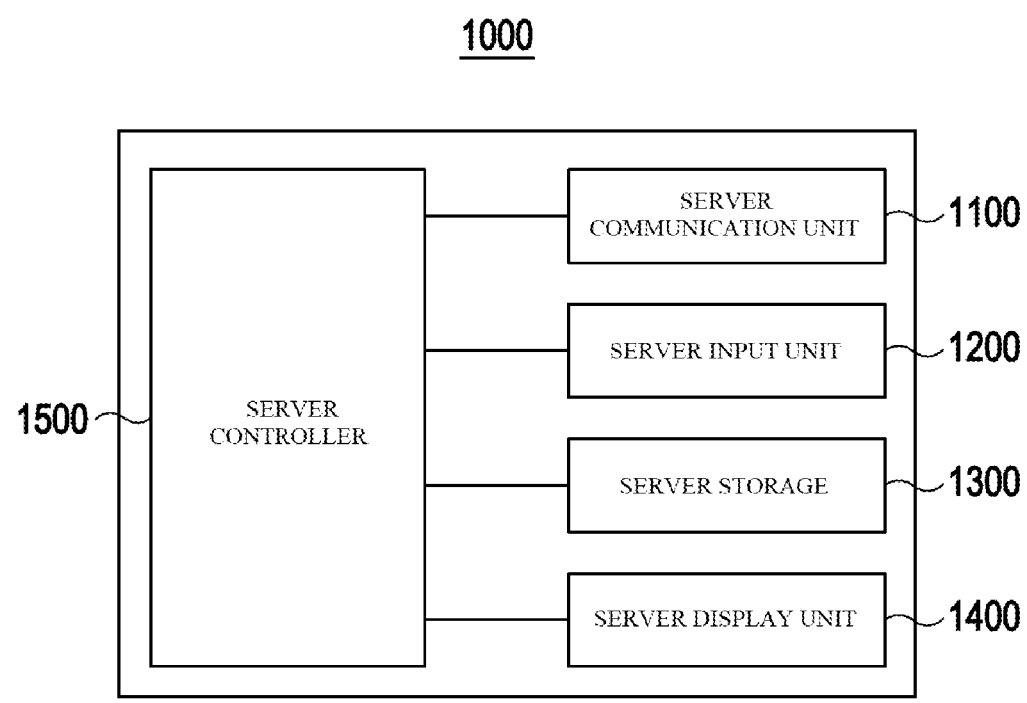
FIG. 2 is a block diagram of a server according to an exemplary embodiment.

FIG. 2 is a block diagram of a server according to an exemplary embodiment.

Referring to FIG. 2, the server 1000 may include a server communication unit 1100, a server input unit 1200, a server storage 1300, a server display unit 1400, and a server controller 1500.

The server communication unit 1100 may communicate with at least one of the terminal 2000 and the control device 3000. As another example, the server communication unit 1100 may transmit bio-information to be stored in the control device 3000 to the terminal 2000.

The server communication unit 1100 may include a BLE, Bluetooth, WLAN, WiFi, WiFi direct, NFC, IrDA, UWB, ZigBee, 3G, 4G, or 5G mobile communication module and wired and wireless communication modules that transmit data in accordance with various other communication standards.

The server input unit 1200 may acquire an electrical signal corresponding to a user input. The server input unit 1200 may include a keypad, a keyboard, a switch, a button, a touchscreen, etc.

The server storage 1300 may store various kinds of data. For example, the server storage 1300 may store information required for user authentication (e.g., user authority information, unique user information (or identification information of the user or terminal, identification information required for payment processing (e.g., card information of the user, authentication information corresponding to the card information, etc.), bio-information of the user, password information, etc.) or information on a user authentication result.

The server storage 1300 may store information acquired from the terminal 2000 or the control device 3000. Also, the server storage 1300 may store a program required for operations of the server 1000.

The server storage 1300 may include at least one type of storage medium among a flash memory, a hard disk type memory, a multimedia card micro type memory, a card type memory (e.g., a secure digital (SD) memory, an extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc. The memory may temporarily, permanently, or semi-permanently store information and may be provided as an embedded type or detachable type.

The server display unit 1400 may output visual information. For example, the server display unit 1400 may be a liquid crystal display (LCD), an organic light-emitting diode (OLED) display, an active-matrix OLED (AMOLED) display, etc.

The server controller 1500 may control each element of the server 1000 or process and compute various kinds of information. Also, the server controller 1500 may control some operations performed by the server 1000 among operations of methods to be described below or may perform computation required for performing the operations.

The server controller 1500 may be implemented as software, hardware, or a combination thereof. As an example, in terms of hardware, the server controller 1500 may be implemented as a field programmable gate array (FPGA), an application specific integrated circuit (ASIC), a semiconductor chip, or one of various other forms of electronic circuits. As another example, in terms of software, the server controller 1500 may be implemented in one of various computer languages or the like as a logic program executed in accordance with the foregoing hardware. According to an exemplary embodiment, the server controller 1500 may include at least one of a positioning module and a control module to be described below.

The server 1000 does not necessarily include all of the above-described elements, and some of the elements may be optionally omitted. For example, when the server 1000 does not directly provide visual information, the server 1000 may be provided without the server display unit 1400. Also, the server 1000 may be provided in a form optionally including elements for performing additional functions, operations, etc.

Figure 3:
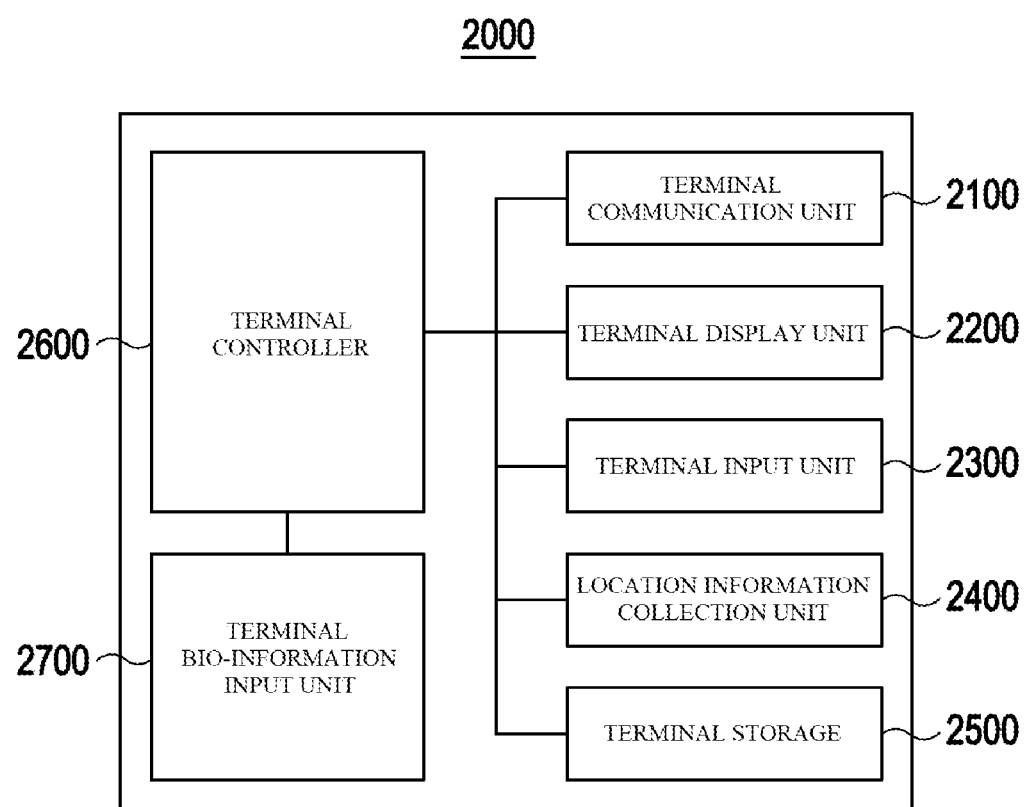
FIG. 3 is a block diagram of a terminal according to an exemplary embodiment.

FIG. 3 is a block diagram of a terminal according to an exemplary embodiment.

Referring to FIG. 3, the terminal 2000 may include a terminal communication unit 2100, a terminal display unit 2200, a terminal input unit 2300, a location information collection unit 2400, a terminal storage 2500, a terminal controller 2600, and a terminal bio-information input unit 2700.

The terminal communication unit 2100 may communicate with at least one of the server 1000 and the control device 3000. For example, the terminal communication unit 2100 may transmit and receive information required for user authentication or user authentication result information with at least one of the server 1000 and the control device 3000.

Also, the terminal communication unit 2100 may include a BLE, Bluetooth, WLAN, WiFi, WiFi direct, NFC, IrDA, UWB, ZigBee, 3G, 4G, or 5G mobile communication module and wired and wireless communication modules that transmit data in accordance with various other communication standards.

The terminal display unit 2200 may output various kinds of visual information. For example, when the control device 3000 is detected through communication with the control device 3000 and a communication connection is established, the terminal display unit 2200 may output the information. Also, the terminal display unit 2200 may visually output a user authentication result. Also, the terminal display unit 2200 may visually output a message received from the server 1000. Also, the terminal display unit 2200 may visually output a screen for inputting setting change information to change a setting of the control device 3000.

The terminal display unit 2200 may be an LCD, an OLED display, an AMOLED display, etc. When the terminal display unit 2200 is provided as a touchscreen, the terminal display unit 2200 may perform the function of the terminal input unit 2300. In this case, the terminal input unit 2300 may optionally not be provided, and the terminal input unit 2300 may perform limited functions of volume control, a power button, a home button, etc.

The terminal input unit 2300 may acquire a signal corresponding to an input of the user. For example, the terminal input unit 2300 may acquire an input for requesting user authentication from the server 1000 or the control device 3000. Also, the terminal input unit 2300 may acquire an input for acquiring information required for user authentication, for example, user authority information, unique user information (or identification information of the user or terminal, identification information required for payment processing (e.g., card information of the user, authentication information corresponding to the card information, etc.), bio-information of the user, password information, etc.). Also, setting change information may be input to the terminal input unit 2300 to change a setting of the control device 3000.

The terminal input unit 2300 may be implemented as, for example, a keyboard, a keypad, a button, a jog shuttle, a wheel, etc. The input of the user may be, for example, pressing, touching, dragging, etc. of a button. When the terminal display unit 2200 is implemented as a touchscreen, the terminal display unit 2200 may play the role of the terminal input unit 2300.

The location information collection unit 2400 may acquire location information for the terminal 2000 to determine its own location. As an example, the location information collection unit 2400 may acquire coordinate information for determining the location like a GPS sensor. As another example, the location information collection unit 2400 may determine the location of the terminal 2000 based on a signal received from an external device. For example, when the terminal 2000 receives a signal indicating a specific area from the control device 3000, the terminal 2000 may determine that the terminal 2000 is in the specific area in response to reception of the signal. According to an exemplary embodiment, the location information collection unit 2400 may be distinguished from a positioning module of the present specification.

The terminal storage 2500 may store various kinds of data. For example, the terminal storage 2500 may store information required for the terminal 2000 to operate (e.g., information required for user authentication (e.g., user authority information, unique user information (or identification information of the user or terminal, identification information required for payment processing (e.g., card information of the user, authentication information corresponding to the card information, etc.), bio-information of the user, password information, etc.)).

The terminal storage 2500 may include at least one type of storage medium among a flash memory, a hard disk type memory, a multimedia card micro type memory, a card type memory (e.g., an SD memory, an XD memory, etc.), a RAM, an SRAM, a ROM, an EEPROM, a PROM, a magnetic memory, a magnetic disc, and an optical disc. The memory may temporarily, permanently, or semi-permanently store information and may be provided as an embedded type or detachable type.

The terminal controller 2600 may control each element of the terminal 2000 or process and compute various kinds of information. The terminal controller 2600 may acquire a signal from some elements included in the terminal 2000. The terminal controller 2600 may control some operations performed by the terminal 2000 among operations of methods to be described below or may perform computation required for performing the operations. According to an exemplary embodiment, the terminal controller 2600 may include at least one of a positioning module and a control module to be described below.

The terminal controller 2600 may be implemented as software, hardware, or a combination thereof. As an example, in terms of hardware, the terminal controller 2600 may be implemented as an FPGA, an ASIC, a semiconductor chip, or one of various other forms of electronic circuits. As another example, in terms of software, the terminal controller 2600 may be implemented as a logic program executed in accordance with the foregoing hardware in one of various computer languages or the like.

The user's bio-information may be input to the terminal bio-information input unit 2700. The bio-information may be at least one of the user's voice information, fingerprint information, iris information, face information, and vein information. The terminal bio-information input unit 2700 may be implemented as at least one of a microphone to which the user's voice information is input, a screen scanner to which the user's fingerprint information is input, and a camera to which the user's iris information, face information, and vein information is input.

The terminal 2000 does not necessarily include all of the above-described elements, and some of the elements may be optionally omitted. For example, when bio-information is not input to the terminal 2000, the terminal 2000 may be provided without the terminal bio-information input unit 2700. Also, the terminal 2000 may be provided without the location information collection unit 2400. Further, the terminal 2000 may be provided in a form optionally including elements for performing additional functions, operations, etc.

Figure 4:
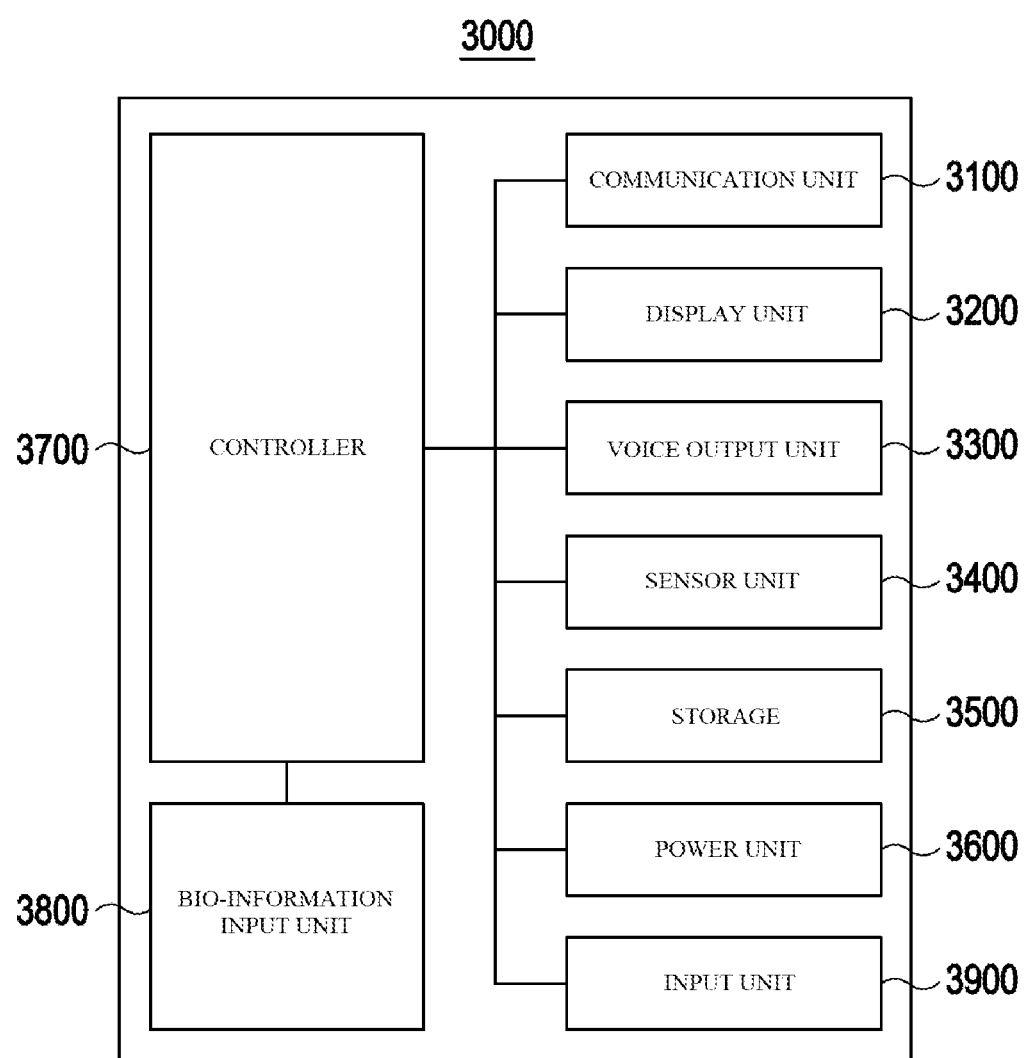
FIG. 4 is a block diagram of a control device according to an exemplary embodiment.

FIG. 4 is a block diagram of a control device according to an exemplary embodiment.

Referring to FIG. 4, the control device 3000 may include a communication unit 3100, a display unit 3200, a voice output unit 3300, a sensor unit 3400, a storage 3500, a power unit 3600, a controller 3700, a bio-information input unit 3800, and an input unit 3900.

The communication unit 3100 may communicate with at least one of the server 1000 and the terminal 2000. For example, the communication unit 3100 may transmit and receive information required for user authentication or user authentication result information with at least one of the server 1000 and the terminal 2000.

As another example, the communication unit 3100 may receive a setting change signal from the terminal 2000. Also, the communication unit 3100 may transmit information on a setting change result to the terminal 2000.

The communication unit 3100 may mainly perform communication in accordance with a wireless communication standard, but may include a BLE, Bluetooth, WLAN, WiFi, WiFi direct, NFC, IrDA, UWB, ZigBee, 3G, 4G, or 5G mobile communication module and wired and wireless communication modules that transmit data in accordance with various other communication standards. Also, the communication unit 3100 may include a short-range wireless communication module that supports NFC, radio-frequency identification (RFID), etc.

The display unit 3200 may output information to be visually provided to the user.

For example, when a door-opening signal is received, the display unit 3200 may output that fact as visual information.

The display unit 3200 may be an LCD, an OLED display, an AMOLED display, etc. When the display unit 3200 includes a touch panel, the display unit 3200 may operate as an input device based on a touch input.

The voice output unit 3300 may output information to be audibly provided to the user. For example, when a door-opening signal is received, the display unit 3200 may output that fact as audible information. Also, when a setting change signal is received, the display unit 3200 may output that fact as audible information.

The voice output unit 3300 may be a speaker, a buzzer, etc. that outputs sound.

The sensor unit 3400 may acquire a signal regarding surroundings required for the control device 3000. For example, the sensor unit 3400 may determine whether there is a movable object (e.g., the user) near the control device 3000. Also, the sensor unit 3400 may be disposed in the control device 3000 or near the control device 3000. According to an exemplary embodiment, the sensor unit 3400 may not be included in the control device 3000. In this case, sensors may be disposed around the control device 3000.

The sensor unit 3400 may be implemented based on various elements. For example, the sensor unit 3400 may be implemented based on various devices such as an infrared sensor, a camera, a wireless communication device (e.g., a Bluetooth communication device), etc. As an example, when the sensor unit 3400 includes an infrared sensor, an output signal of the sensor unit 3400 may be changed or output upon the user's passage through a gate, and it is possible to determine whether the user is near the gate based on the change or output of the output signal. As another example, when the sensor unit 3400 includes a camera, the sensor unit 3400 may track the user's movement based on images acquired from the camera and determine whether the user is near the gate based on the tracking result. As still another example, when the sensor unit 3400 includes a wireless communication device, the wireless communication device may communicate with the user's terminal, and the sensor unit 3400 may determine whether the user is near the gate based on the strength of a signal received from the wireless communication device or the terminal.

According to an exemplary embodiment, the sensor unit 3400 may acquire a signal regarding the distance from the user, an object, etc. As another example, the sensor unit 3400 may acquire a signal required for determining a location of the control device 3000.

The storage 3500 may store various kinds of information. For example, a program for performing control operations of the controller 3700 may be stored, and externally received data, data generated from the controller 3700, etc. may be stored. Also, the storage 3500 may store information required for the control device 3000 to operate (e.g., information required for user authentication (e.g., user authority information, and user identification information (e.g., identifier information of the user or terminal, bio-information of the user, password information, etc.))) and user authentication result information.

The storage 3500 may include at least one type of storage medium among a flash memory, a hard disk type memory, a multimedia card micro type memory, a card type memory (e.g., an SD memory, an XD memory, etc.), a RAM, an SRAM, a ROM, an EEPROM, a PROM, a magnetic memory, a magnetic disc, and an optical disc. The memory may temporarily, permanently, or semi-permanently store information and may be provided as an embedded type or detachable type.

The power unit 3600 may provide power required for locking or unlocking a gate. Also, the power unit 3600 may provide power required for opening or closing a gate. The power unit 3600 may be provided as a motor, a solenoid, an actuator, etc.

When the power unit 3600 provides power required for locking or unlocking a gate, the power unit 3600 may provide power so that a lock unit (not shown) which locks or unlocks the gate switches to and/or remains in a locked or unlocked state. The lock unit may be provided as, for example, a deadbolt, a latch bolt, or a combination thereof. Also, the lock unit is not limited to the deadbolt and latch bolt described as examples, and any commonly used lock unit may be employed.

According to an exemplary embodiment, the power unit 3600 may or may not be included in the control device 3000. The power unit 3600 may be disposed in the form of a separate device near the control device 3000. In this case, the control device 3000 may provide a signal for controlling the power unit 3600 to the power unit 3600. Also, the above-described lock unit may be included in the control device 3000 or disposed near the control device 3000 and controlled by the control device 3000.

The controller 3700 may control each element of the control device 3000 or process and compute various kinds of information. The controller 3700 may acquire a signal from some elements included in the control device 3000. The controller 3700 may control operations for performing some operations performed by the control device 3000 among operations of methods to be described below or may perform computation required for performing the operations. According to an exemplary embodiment, the controller 3700 may include at least one of a positioning module and a control module to be described below.

The controller 3700 may be implemented as software, hardware, or a combination thereof. As an example, in terms of hardware, the controller 3700 may be implemented as an FPGA, an ASIC, a semiconductor chip, or one of various other forms of electronic circuits. As another example, in terms of software, the controller 3700 may be implemented as a logic program executed in accordance with the foregoing hardware in one of various computer languages or the like.

The user's bio-information may be input to the bio-information input unit 3800. For example, at least one of the user's voice information, fingerprint information, iris information, face information, and vein information may be input to the bio-information input unit 3800. The bio-information input unit 3800 may be implemented as at least one of a microphone to which the user's voice information is input, a screen scanner to which the user's fingerprint information is input, and a camera to which the user's iris information, face information, and vein information are input.

The input unit 3900 may be configured to receive various inputs. For example, the input unit 3900 may acquire an input for requesting user authentication from the server 1000 or the terminal 2000. Also, the input unit 3900 may acquire an input (e.g., identification information of the user or terminal, password information, bio-information, etc.) for acquiring information required for user authentication. Setting change information may be input to the input unit 3900 to change a setting of the control device 3000.

A user authentication request may be input to the input unit 3900 by the user. For example, when user authentication is authentication of the user for accessing a specific area, the control device 3000 may receive an input for opening a door and operate the power unit 3600 to open the door or may transmit an access authentication request signal to the server 1000 or the terminal 2000. The input unit 3900 may be implemented as, for example, a keyboard, a keypad, a button, a jog shuttle, a wheel, etc. The input of the user may be, for example, pressing, touching, dragging, etc. of a switch or button. When the display unit 3200 is implemented as a touchscreen, the display unit 3200 may play the role of the input unit 3900.

The control device 3000 according to an exemplary embodiment of the present application does not necessarily include all of the above-described elements, and some of the elements may be optionally omitted.

The management system 10000 according to an exemplary embodiment of the present application may be implemented to include at least one control device 3000. For example, the management system 10000 may include the control device 3000 including the communication unit 3100 and the controller 3700. As a specific example, the control device 3000 may perform a function of receiving information acquired from the terminal 2000 through the communication unit 3100 which performs the function of a reader, analyzing the acquired information through the controller 3700 which performs the function of a controller, and controlling operations such as access management, work attitude management, system mode change, etc.

Also, the control device 3000 may be provided in a form optionally including elements for performing additional functions, operations, etc.

Figure 5:
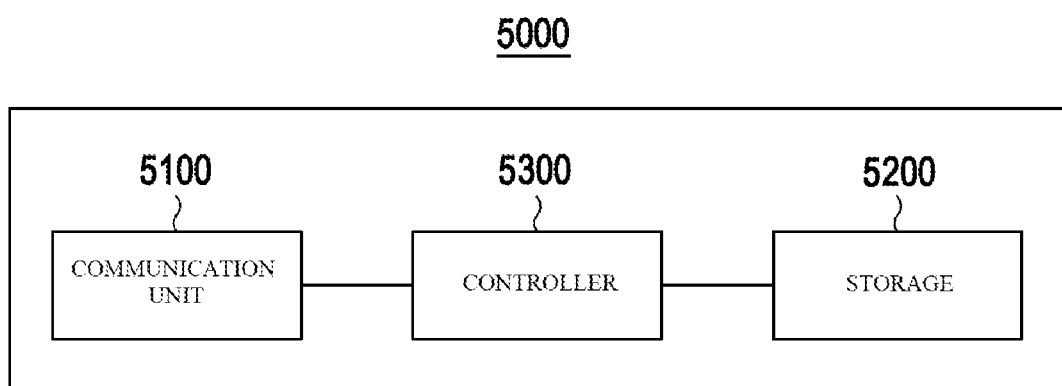
FIG. 5 is a diagram illustrating a location-recognized device and a location-unrecognized device according to an exemplary embodiment.

FIG. 5 is a diagram illustrating a location-recognized device and a location-unrecognized device according to an exemplary embodiment.

Referring to FIG. 5, each of the location-recognized device and the location-unrecognized device may include a configuration of the device 5000 of FIG. 5.

The device 5000 may include a communication unit 5100, a storage 5200, and a controller 5300. The device 5000 may be implemented in one of various forms. For example, the device 5000 may be implemented in the form of a beacon (e.g., a UWB beacon) that periodically broadcasts a certain signal.

The device 5000 may communicate with at least one of the server 1000, the terminal 2000, and the control device 3000.

The communication unit 5100 may include a BLE, Bluetooth, WLAN, WiFi, WiFi direct, NFC, IrDA, UWB, ZigBee, 3G, 4G, or 5G mobile communication module and wired and wireless communication modules that transmit data in accordance with various other communication standards.

The storage 5200 may store various kinds of data. For example, when the device 5000 is a location-recognized device, the storage 5200 may include coordinate information of the location-recognized device. The coordinate information may be input from at least one of the server 1000, the terminal 2000, and the control device 3000. Also, the coordinate information may be input from an administrator.

When the device 5000 is a location-unrecognized device, the storage 5200 may not include coordinate information of the location-unrecognized device. However, when the coordinate information of the location-unrecognized device is estimated by the positioning module, the coordinate information of the location-unrecognized device may be acquired from the positioning module.

The storage 5200 may store information acquired from the server 1000, the terminal 2000, or the control device 3000. Also, the storage 5200 may store a program required for the location-recognized device or location-unrecognized device to operate.

The storage 5200 may include at least one type of storage medium among a flash memory, a hard disk type memory, a multimedia card micro type memory, a card type memory (e.g., an SD memory, an XD memory, etc.), a RAM, an SRAM, a ROM, an EEPROM, a PROM, a magnetic memory, a magnetic disc, and an optical disc. The memory may temporarily, permanently, or semi-permanently store information and may be provided as an embedded type or detachable type.

The controller 5300 may control each element of the device 5000 or process and compute various kinds of information. The controller 5300 may control operations for performing some operations performed by the location-recognized device or location-unrecognized device among operations of methods to be described below or may perform computation required for performing the operations.

The controller 5300 may be implemented as software, hardware, or a combination thereof. As an example, in terms of hardware, the controller 5300 may be implemented as an FPGA, an ASIC, a semiconductor chip, or one of various other forms of electronic circuits. As another example, in terms of software, the controller 5300 may be implemented as a logic program executed in accordance with the foregoing hardware in one of various computer languages or the like.

The device 5000 does not necessarily include all of the above-described elements, and some of the elements may be optionally omitted. Also, the device 5000 may be provided in a form optionally including elements for performing additional functions, operations, etc.

The management system 10000 according to various exemplary embodiments and components, operations, and terms included in the management system 10000 have been described above. The above-described management system 10000 and components, operations, and terms included in the management system 10000 will be applied to various methods and embodiments to be described below. However, the management system 10000 described below does not necessarily have the above-described elements and functions, and the above description may be applied to a management system that is configured differently from the above-described management system 10000.

Figure 6:
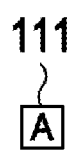
FIG. 6 is a diagram illustrating a positioning method of a positioning module for a terminal according to an exemplary embodiment.
Figure 6:
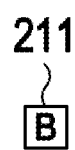
Figure 6:
Figure 6:
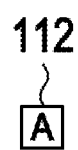
Figure 6:
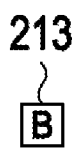
Figure 6:
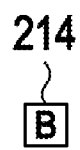
Figure 6:
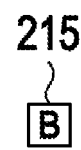
Figure 6:
Figure 6:
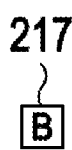
Figure 6:
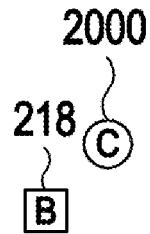
Figure 6:
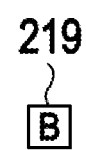
Figure 6:
Figure 6:
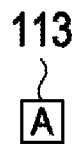
Figure 6:
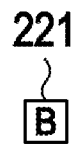
Figure 6:
Figure 6:

FIG. 6 is a diagram illustrating a positioning method of a positioning module for a terminal according to an exemplary embodiment.

Referring to FIG. 6, one or more location-recognized devices 111 to 114 and one or more location-unrecognized devices 211 to 222 may be disposed in a certain zone. In FIG. 6, the plurality of location-recognized devices 111 to 114 and the plurality of location-unrecognized devices 211 to 222 are shown, but the number of devices is not limited thereto. One or more location-recognized devices and one or more location-unrecognized devices may be disposed in the certain zone. Also, in FIG. 6, the location-recognized devices 111 to 114 and the location-unrecognized devices 211 to 222 are disposed at regular distances, but this is for convenience of description. The location-recognized devices 111 to 114 and the location-unrecognized devices 211 to 222 may be irregularly disposed.

The positioning module may determine a location of the terminal 2000 using signals transmitted and received in communication between at least one of the location-recognized devices 111 to 114 and the terminal 2000.

According to an exemplary embodiment, the terminal 2000 may transmit a signal to at least one of the location-recognized devices 111 to 114. In this case, the terminal 2000 may receive a signal from the at least one of the location-recognized devices 111 to 114 and transmit a signal in response to the received signal. Also, the terminal 2000 may initially transmit a signal to the at least one of the location-recognized devices 111 to 114 without receiving a signal from the at least one of the location-recognized devices 111 to 114.

For example, a signal transmitted or received by the terminal 2000 may be generated and transmitted or received in accordance with a UWB communication protocol. A signal transmitted by the terminal 2000 may include identification information of the terminal 2000. Also, the signal transmitted by the terminal 2000 may be broadcast within a certain communication zone or transmitted to at least one of the location-recognized devices 111 to 114 which is specified. The one or more location-recognized devices 111 to 114 may transmit signals to the terminal 2000 in response to the signal received from the terminal 2000. Here, the signals transmitted from the one or more location-recognized devices 111 to 114 may include identification information of each location-recognized device and coordinate information of each location-recognized device. Also, when the one or more location-recognized devices 111 to 114 initially transmit signals to the terminal 2000, the signals may include identification information of each location-recognized device and coordinate information of each location-recognized device.

According to an exemplary embodiment, the positioning module may be included in the terminal 2000. In this case, the positioning module may acquire distance information between the terminal 2000 and at least one of the location-recognized devices 111 to 114 based on a time at which the terminal 2000 transmits a signal to the at least one of the location-recognized devices 111 to 114 and a time at which the terminal 2000 receives a signal from the at least one of the location-recognized devices 111 to 114. Also, according to an exemplary embodiment, the positioning module may acquire distance information between the terminal 2000 and at least three of the location-recognized devices 111 to 114 based on a time at which the terminal 2000 transmits a signal to the at least three of the location-recognized devices 111 to 114 and times at which the terminal 2000 receives signals from the at least three of the location-recognized devices 111 to 114.

Also, the positioning module may acquire coordinate information of the terminal 2000 using the coordinate information of the at least one (or at least three) of the location-recognized devices 111 to 114 and the distance information of the at least one (or at least three) of the location-recognized devices 111 to 114 acquired by the terminal 2000. For example, the positioning module may estimate the coordinate information of the terminal 2000 using triangulation based on the coordinate information of the at least three of the location-recognized devices 111 to 114 and the distance information of the at least three of the location-recognized devices 111 to 114. Also, the positioning module may acquire information on a time at which the coordinate information of the terminal 2000 is estimated. In addition, the positioning module may estimate the coordinate information of the terminal 2000 using the TDoA method based on signals transmitted and received between the at least three of the location-recognized devices 111 to 114 and the terminal 2000.

Also, the positioning module may acquire angle information between the terminal 2000 and at least one of the location-recognized devices 111 to 114. For example, the positioning module may acquire angle information between the terminal 200 and at least one of the location-recognized devices 111 to 114 using the PDoA method. As a specific example, the terminal 2000 may include a plurality of antennas. For example, when the terminal 2000 includes at least two antennas, an angle between the location-recognized device 111 and the antennas of the terminal 2000 may be θ, and a distance between the at least two antennas may be d. In this case, a phase difference between signals received by the at least two antennas from the location-recognized device 111 may be d*sin θ. The positioning module may acquire angle information between the terminal 2000 and the location-recognized device 111 using the phase difference. Then, the positioning module may estimate coordinate information of the terminal 2000 based on the coordinate information of the at least one of the location-recognized devices 111 to 114 and the angle information.

According to another exemplary embodiment, the positioning module may be included in the server 1000 or the control device 3000. In this case, the positioning module may acquire distance information of the one or more location-recognized devices 111 to 114 from the terminal 2000 and acquire coordinate information of each of the location-recognized devices 111 to 114 from the location-recognized device. Here, the coordinate information of each location-recognized device may be stored in or acquired by the positioning module in advance. The positioning module may also acquire the coordinate information of each location-recognized device from the terminal 2000. The positioning module may acquire coordinate information of the terminal 2000 using triangulation based on the coordinate information of each of the one or more location-recognized devices 111 to 114 and the distance information of the one or more location-recognized devices 111 to 114. Also, the positioning module may acquire information on a time at which the coordinate information of the terminal 2000 is estimated. In addition, the positioning module may estimate the coordinate information of the terminal 2000 using the TDoA method based on signals transmitted and received between at least three of the location-recognized devices 111 to 114 and the terminal 2000.

Also, the positioning module may acquire angle information between the terminal 2000 and at least one of the location-recognized devices 111 to 114. For example, the positioning module may acquire angle information between the terminal 200 and at least one of the location-recognized devices 111 to 114 using the PDoA method. Then, the positioning module may estimate coordinate information of the terminal 2000 based on the coordinate information of the at least one of the location-recognized devices 111 to 114 and the angle information.

The positioning module may transmit the coordinate information of the terminal 2000 and/or information on a time at which the coordinate information of the terminal 2000 is estimated to the terminal 2000.

Figure 7:
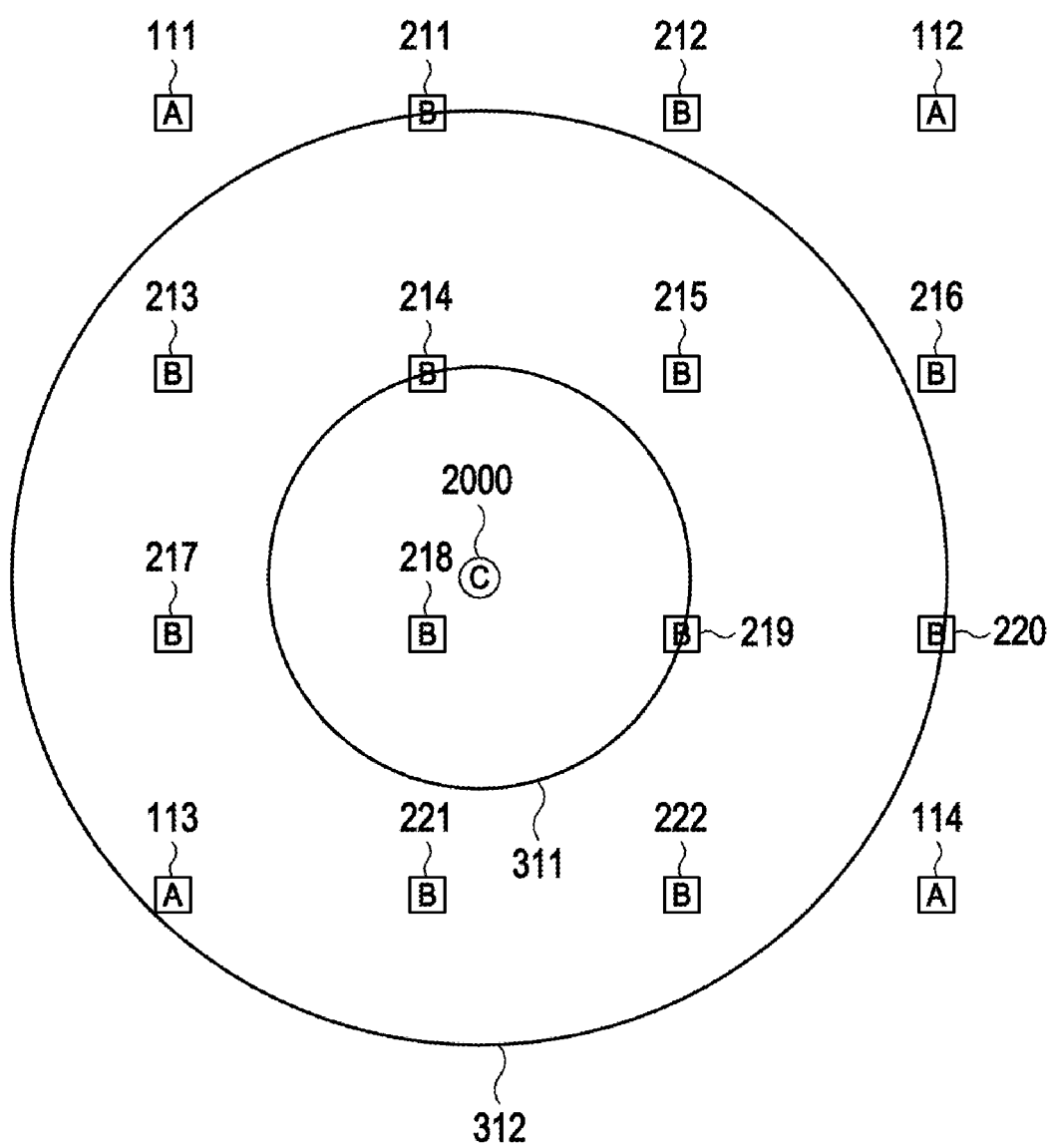
FIGS. 7 to 9 are diagrams illustrating a positioning method of a positioning module for a location-unrecognized device according to an exemplary embodiment.
Figure 8:
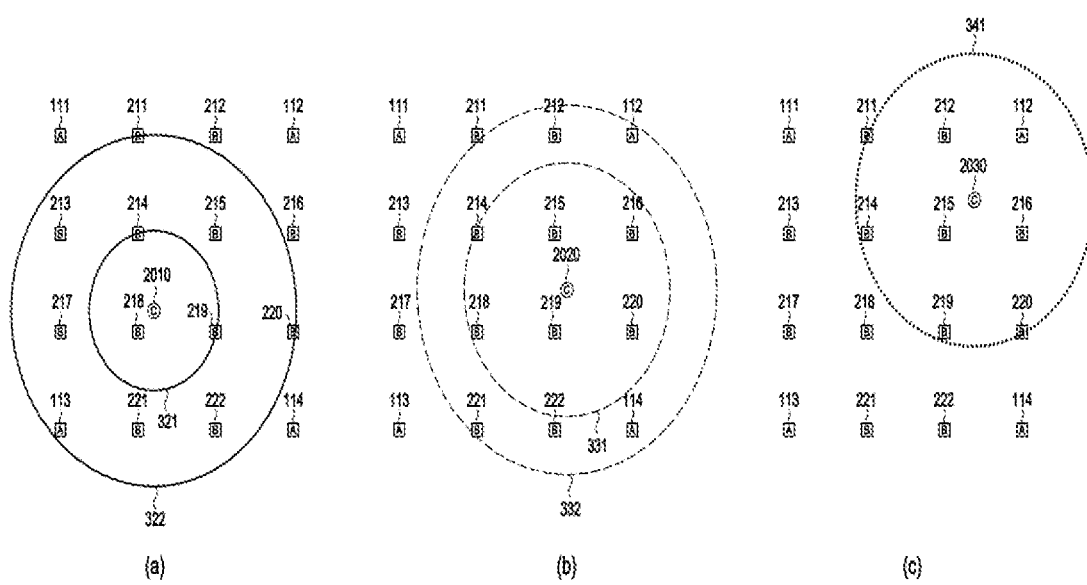
Figure 9:
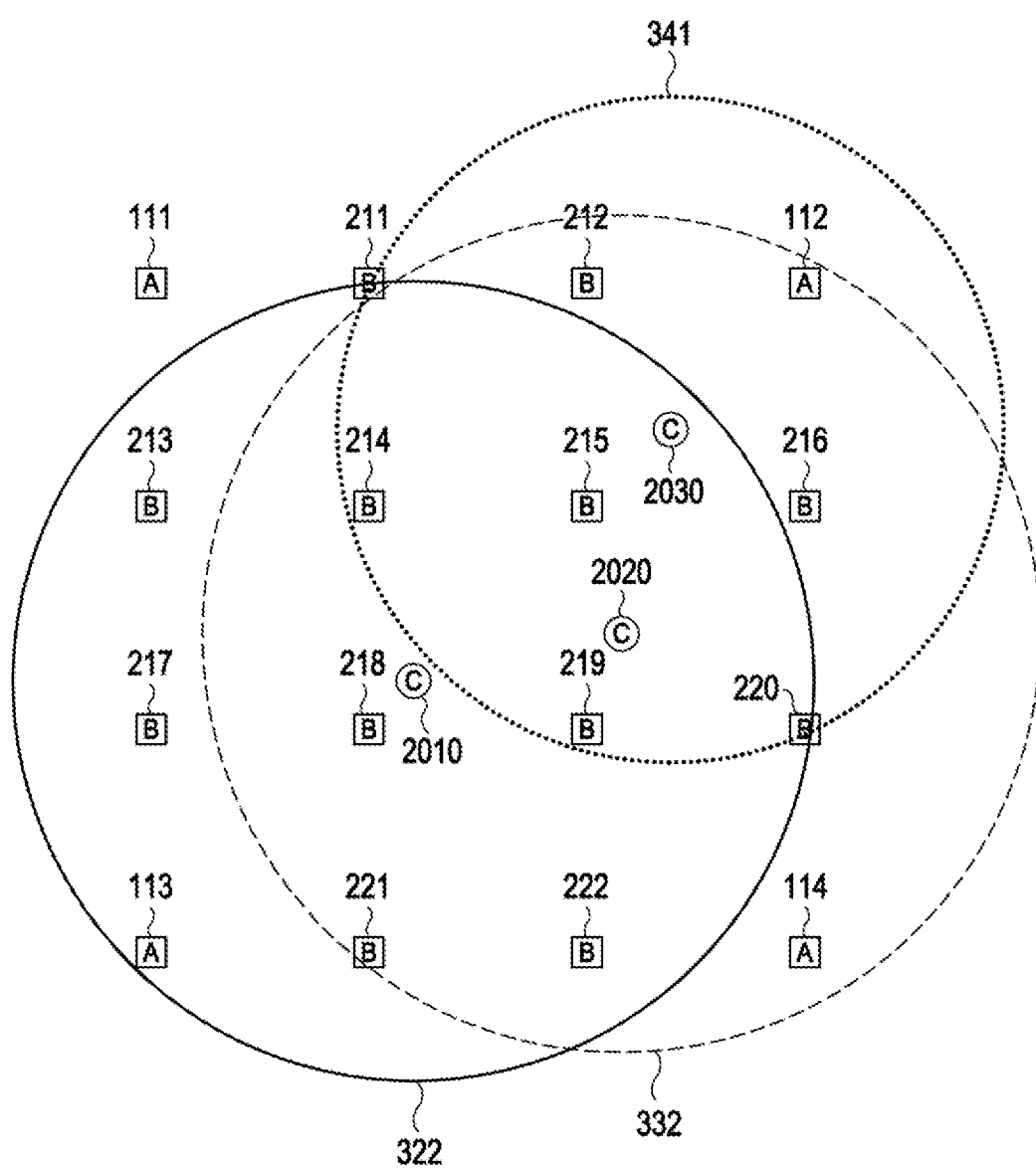

FIGS. 7 to 9 are diagrams illustrating a positioning method of a positioning module for a location-unrecognized device according to an exemplary embodiment.

FIG. 7 is a diagram illustrating generation of virtual circles by a positioning module according to an exemplary embodiment.

Referring to FIG. 7, the positioning module may determine a location of at least one of the location-unrecognized devices 211 to 222 using signals transmitted and received in communication between the at least one of the location-unrecognized devices 211 to 222 and the terminal 2000.

According to an exemplary embodiment, the terminal 2000 may transmit a signal to the at least one of the location-unrecognized devices 211 to 222 at a first location. The terminal 2000 may receive a signal from the at least one of the location-unrecognized devices 211 to 222 and transmit a signal in response to the received signal or may initially transmit a signal to the at least one of the location-unrecognized devices 211 to 222 without receiving a signal from the at least one of the location-unrecognized devices 211 to 222.

For example, a signal transmitted or received by the terminal 2000 may be generated and transmitted or received in accordance with the UWB communication protocol. A signal transmitted by the terminal 2000 may include identification information of the terminal 2000. Also, the signal transmitted by the terminal 2000 may be broadcast within a certain communication zone or transmitted to at least one of the location-unrecognized devices 211 to 222 which is specified. The one or more location-unrecognized devices 211 to 222 may transmit signals to the terminal 2000 in response to the signal received from the terminal 2000. Here, the signals transmitted from the one or more location-unrecognized devices 211 to 222 may include identification information of each location-unrecognized device and coordinate information of each location-unrecognized device. Also, when the one or more location-unrecognized devices 211 to 222 initially transmit signals to the terminal 2000, the signals may include identification information of each location-unrecognized device and coordinate information of each location-unrecognized device.

Signals transmitted and received between the terminal 2000 and at least one of the location-unrecognized devices 211 to 222 may include angle information between the terminal 2000 and the at least one of the location-unrecognized devices 211 to 222.

According to an exemplary embodiment, a location of at least one of the location-unrecognized devices 211 to 222 may be determined using one or more virtual circles generated based on the terminal 2000.

According to a specific exemplary embodiment, the positioning module may be included in the terminal 2000. The positioning module may generate at least one virtual circle based on distance information between the terminal 2000 and at least one of the location-unrecognized devices 211 to 222. For example, the positioning module may generate a plurality of virtual circles which have distances between the terminal 2000 and all the location-unrecognized devices 211 to 222 as radii, or may generate virtual circles 311 and 312 which have distances between the terminal 2000 and some (e.g., 214, 219, 211, and 220) of the location-unrecognized devices 211 to 222 as radii. Also, the positioning module may determine a minimum distance and maximum distance among the distances between the terminal 2000 and all the location-unrecognized devices 211 to 222 and generate at least one virtual circle having an arbitrary radius between the minimum distance and the maximum distance.

According to an exemplary embodiment, the positioning module may generate one virtual circle 311 which has a distance between the terminal 2000 and one location-unrecognized device (e.g., 214) as a radius. Also, the positioning module may generate at least one virtual circle which has a predetermined radius regardless of the distances between the terminal 2000 and the location-unrecognized devices 211 to 222.

According to another exemplary embodiment, the positioning module may be included in the server 1000 or the control device 3000. In this case, the positioning module may acquire distance information between the terminal 2000 and at least one of the location-unrecognized devices 211 to 222 and the coordinate information of the terminal 2000 from the terminal 2000. The positioning module may generate at least one virtual circle centered on the terminal 2000 based on the distance information between the terminal 2000 and the at least one of the location-unrecognized devices 211 to 222 and the coordinate information of the terminal 2000. Since the above-described method of generating a virtual circle when the positioning module is included in the terminal may be applied, detailed description thereof will be omitted.

FIG. 8 is a diagram illustrating generation of virtual circles at different locations by a positioning module according to an exemplary embodiment.

(a) of FIG. 8 may show a case in which a terminal 2010 is at a first location, (b) of FIG. 8 may show a case in which a terminal 2020 is at a second location, and (c) of FIG. 8 may show a case in which a terminal 2030 is at a third location. Here, the terminals 2010 to 2030 may be the same terminal or different terminals.

When the terminals 2010 to 2030 are respectively at the first to third locations, the positioning module may acquire at least one of coordinate information of the terminals 2010 to 2030 and angle information between each of the terminals 2010 to 2030 respectively at the first to third locations and at least one of the location-recognized devices 111 to 114 based on signals transmitted and received between the terminals 2010 to 2030 and the at least one of the location-recognized devices 111 to 114.

Also, the positioning module may generate a virtual circle centered on each of the terminals 2010 to 2030 at the locations. Here, the number of virtual circles generated by the positioning module or radius of the virtual circles may be the same or different.

For example, in (a) of FIG. 8, when the terminal 2010 is at the first location, the positioning module may generate two virtual circles 321 and 322. The virtual circle 321 may have a first distance which is a distance between the terminal 2010 and the location-unrecognized devices 214 to 219 as a radius. Also, the virtual circle 322 may have a second distance which is a distance between the terminal 2010 and the location-unrecognized devices 211 to 220 as a radius. Accordingly, the virtual circle 321 may come into contact with the location-unrecognized devices 214 and 219, and the virtual circle 322 may come into contact with the location-unrecognized devices 211 and 220.

In (b) of FIG. 8, when the terminal 2020 is at the second location, the positioning module may generate two virtual circles 331 and 332. The virtual circle 331 may have a third distance which is a distance between the terminal 2020 and the location-unrecognized device 214 as a radius. Also, the virtual circle 322 may have a fourth distance which is a distance between the terminal 2020 and the location-unrecognized devices 211 to 221 as a radius. Accordingly, the virtual circle 331 may come into contact with the location-unrecognized device 214, and the virtual circle 322 may come into contact with the location-unrecognized devices 211 and 221.

For example, in (c) of FIG. 8, when the terminal 2030 is at the third location, the positioning module may generate one virtual circle 341. The virtual circle 341 may have a fifth distance which is a distance between the terminal 2030 and the location-unrecognized devices 211 to 220 as a radius. Accordingly, the virtual circle 341 may come into contact with the location-unrecognized devices 211 and 220.

FIG. 9 is a diagram illustrating a method of acquiring coordinate information of a location-unrecognized device using virtual circles generated at different locations according to an exemplary embodiment.

Referring to FIG. 9, the positioning module may acquire coordinate information of a location-unrecognized device at a point of crossing between virtual circles generated at different locations.

According to an exemplary embodiment, as in FIG. 8, the terminals 2010 to 2030 of FIG. 9 may be the same terminal. The positioning module may acquire coordinate information of the terminals 2010 to 2030 at first to third locations, respectively.

Also, the positioning module may determine a location-unrecognized device at a point of crossing between virtual circles which are separately generated at the first to third locations. In the example of FIG. 9, the location-unrecognized devices 211 and 220 may be present on the virtual circle 322 (having the second distance as a radius) generated from the terminal 2010 at the first location, the location-unrecognized devices 211 and 221 may be present on the virtual circle 332 (having the fourth distance as a radius) generated from the terminal 2020 at the second location, and the location-unrecognized device 211 may be present on the virtual circle 341 (having the fifth distance as a radius) generated from the terminal 2030 at the third location. In other words, the location-unrecognized device 211 may be present in common on the virtual circles 322, 332, and 341 generated from the terminals 2010 to 2030. The location-unrecognized device 211 may be the second distance away from the first location, the fourth distance away from the second location, and the fifth distance away from the third location. The positioning module may estimate coordinate information of the location-unrecognized device 211 using the coordinate information of the first to third locations and the second, fourth, and fifth distances. For example, the positioning module may calculate coordinate information of the location-unrecognized device 211 using triangulation based on the coordinate information of the first to third locations and the second, fourth, and fifth distances.

According to an exemplary embodiment, when the terminals 2010 to 2030 are different terminals, the terminals 2010 to 2030 may be at the first to third locations at the same time or different times, respectively. Also, when the terminals 2010 to 2030 are the same terminal, the terminals 2010 to 2030 may be at the first to third locations at different times. Since the location-recognized devices 111 to 114 are fixedly disposed, the coordinate information of the first to third locations is not variable but is fixed. Also, since the location-unrecognized devices 211 to 222 are fixedly disposed, the coordinate information of the location-unrecognized device 211 can be accurately calculated even when the terminals 2010 to 2030 are at the first to third locations at different times, that is, even when virtual circles are generated from the terminals 2010 to 2030 at different times.

Also, when the terminals 2010 to 2030 are different terminals, the positioning module may be included in each of the terminals 2010 to 2030. For example, a first positioning module included in the terminal 2010 may generate the virtual circles 321 and 322, a second positioning module included in the terminal 2020 may generate the virtual circles 331 and 332, and a third positioning module included in the terminal 2030 may generate the virtual circle 341.

In this case, any one of the positioning modules included in the terminals 2010 to 2030 may calculate coordinate information of the location-unrecognized device 211. For example, the first positioning module included in the terminal 2010 may receive the coordinate information of the second location and the third location, information on the virtual circles 322, 332, and 341, information on the third distance to fifth distance, and/or information on the location-unrecognized devices 211, 214, 220, and 221 present on the virtual circles 322, 332, and 341 from the other terminals 2020 and 2030 and calculate coordinate information of the location-unrecognized device 211 using the received information and information acquired from the terminal 2010.

Also, when the terminals 2010 to 2030 are the same terminal, coordinate information of the location-unrecognized device 211 may be calculated based on information acquired at each location by a positioning module included in the terminals 2010 to 2030.

Further, a positioning module included in the control device 3000 or the server 1000 may calculate coordinate information of the location-unrecognized device 211. In this case, the positioning module may acquire the coordinate information of the first to third locations, information on the virtual circles 321, 322, 331, 332, and 341, information on the first to fifth distances, and/or information on the location-unrecognized devices 211, 214, 219, 220, and 221 present on the virtual circles 321, 322, 331, 332, and 341 from the terminals 2010 to 2030 and calculate coordinate information of the location-unrecognized device 211 using the acquired information.

In this way, the positioning module may also acquire coordinate information of the other location-unrecognized devices 212 to 222.

As described above, the positioning module acquires coordinate information of the location-unrecognized devices 211 to 222 through communication between the location-recognized devices 111 to 114 and the terminals 2010 to 2030 and communication between the location-unrecognized devices 211 to 222 and the terminals 2010 to 2030, and thus the coordinate information of the location-unrecognized devices 211 to 222 can be accurately acquired in an uncomplicated manner without a time synchronization process or survey equipment.

Figure 10:
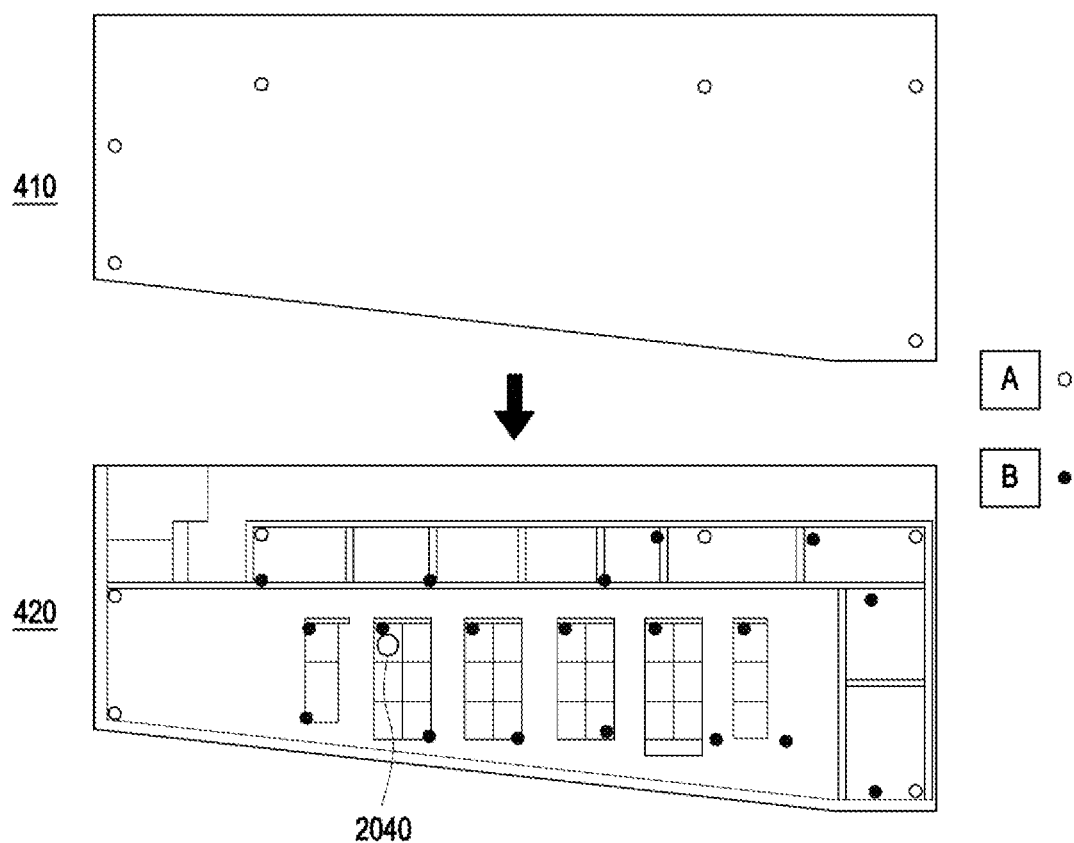
FIG. 10 is a diagram illustrating map generation according to an exemplary embodiment.

FIG. 10 is a diagram illustrating map generation according to an exemplary embodiment.

Referring to FIG. 10, the positioning module may acquire initial map information 410. As an example, the initial map information 410 graphically shows a certain zone and may include coordinate information of at least one location-recognized device A. Since the at least one location-recognized device A is disposed at a fixed location, the coordinate information of the at least one location-recognized device A may be fixed.

When coordinate information of a terminal 2040 is acquired through communication between the terminal 2040 and the at least one location-recognized device A, the positioning module may include the coordinate information of the terminal 2040 in the initial map information 410. In this case, the terminal 2040 may move and communicate in real time with the at least one location-recognized device A. Accordingly, the coordinate information of the terminal 2040 may be changed in real time. In addition, when there is a terminal other than the terminal 2040 in the certain zone, coordinate information of the other terminal may be included in the initial map information 410.

When at least one location-unrecognized device B is fixedly disposed in the certain zone, the positioning module may acquire coordinate information of the at least one location-unrecognized device B through communication between the terminal 2040 and the at least one location-unrecognized device B. Since the description of FIGS. 6 to 9 may be applied to the process in which the positioning module acquires coordinate information of the at least one location-unrecognized device B, detailed description thereof will be omitted.

The positioning module may generate final map information 420 by including the coordinate information of the at least one location-unrecognized device B in the initial map information 410. Accordingly, the final map information 420 may include coordinate information of the at least one location-recognized device A and the at least one location-unrecognized device B, and the coordinate information may be fixed in the final map information 420. Also, in the final map information 420, the coordinate information of the terminal 2040 may be changed in accordance with movement of the terminal 2040. In other words, when the terminal 2040 moves, the location of the terminal 2040 may be tracked in the final map information 420.

When the at least one location-recognized device A and the at least one location-unrecognized device B are disposed at other locations, the coordinate information of the at least one location-recognized device A and the at least one location-unrecognized device B may be changed in the final map information 420.

As described above, even when initial location information of the at least one location-unrecognized device B is unknown, the positioning module can accurately generate the final map information 420 reflecting location information of the at least one location-unrecognized device B through communication between the at least one location-recognized device A and the terminal 2040 and communication between the location-unrecognized device B and the terminal 2040. Also, the positioning module can accurately track the location of the terminal 2040 in an uncomplicated manner.

The initial map information 410 and the final map information 420 may be used in various embodiments. As an example, the initial map information 410 and the final map information 420 may be useful in generating and maintaining maps of the inside of a building, a basement, a tunnel, etc. whose GPS information may be inaccurate. As an example, when at least one location-unrecognized device B is added to the inside of indoor map such as office drawing and firefighting drawing, the positioning module may acquire a final indoor map, such as the final map information 420, by adding coordinate information of the at least one location-unrecognized device B to an initial indoor map such as the initial map information 410. Also, after the final indoor map is acquired, at least one location-unrecognized device B may be added or changed in location in the inside of the building, and the positioning module may maintain the final indoor map by adding or updating coordinates of the at least one location-unrecognized device B in the final indoor map.

As another example, the initial map information 410 and the final map information 420 may be used as basic data for implementing a digital twin. For example, the initial map information 410 may show a security zone in which a factory, a facility, or property is present. The at least one location-unrecognized device B may be a factory, a facility, or property. When at least one location-unrecognized device B is added or changed in location, the positioning module may generate final map information 420 by adding or updating coordinates of the at least one location-unrecognized device B, and the final map information 420 may be used as basic data for implementing a digital twin.

As still another example, the initial map information 410 and the final map information 420 may be used as survey data for implementing a virtual space based on a real space. For example, at least one location-unrecognized device B may correspond to a structure or object in a real space. Accordingly, the positioning module may generate the final map information 420 while adding or updating coordinates of the at least one location-unrecognized device B, and the generated final map information 420 may be used as survey data for implementing a virtual space.

Figure 11:
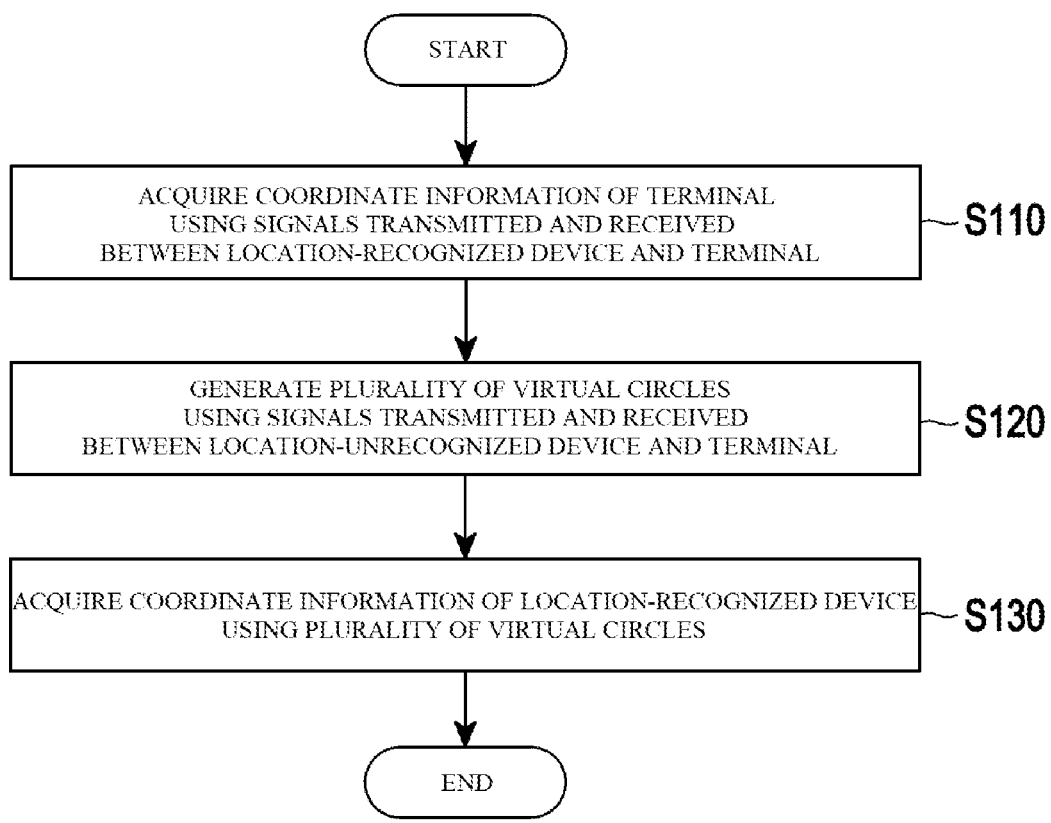
FIG. 11 is an operation flowchart illustrating a positioning method of a positioning module according to an exemplary embodiment.

FIG. 11 is an operation flowchart illustrating a positioning method of a positioning module according to an exemplary embodiment.

Referring to FIG. 11, the positioning method of a positioning module may include operation S110 of acquiring coordinate information of a terminal using signals transmitted and received between a location-recognized device and the terminal, operation S120 of generating a plurality of virtual circles using signals transmitted and received between a location-unrecognized device and the terminal, operation S130 of acquiring coordinate information of the location-unrecognized device using the plurality of virtual circles, and operation S140 of generating map information using the coordinate information of the location-unrecognized device.

Since the description of FIGS. 6 to 10 may be applied to operations S100 to S400, detailed description thereof will be omitted.

Figure 12:
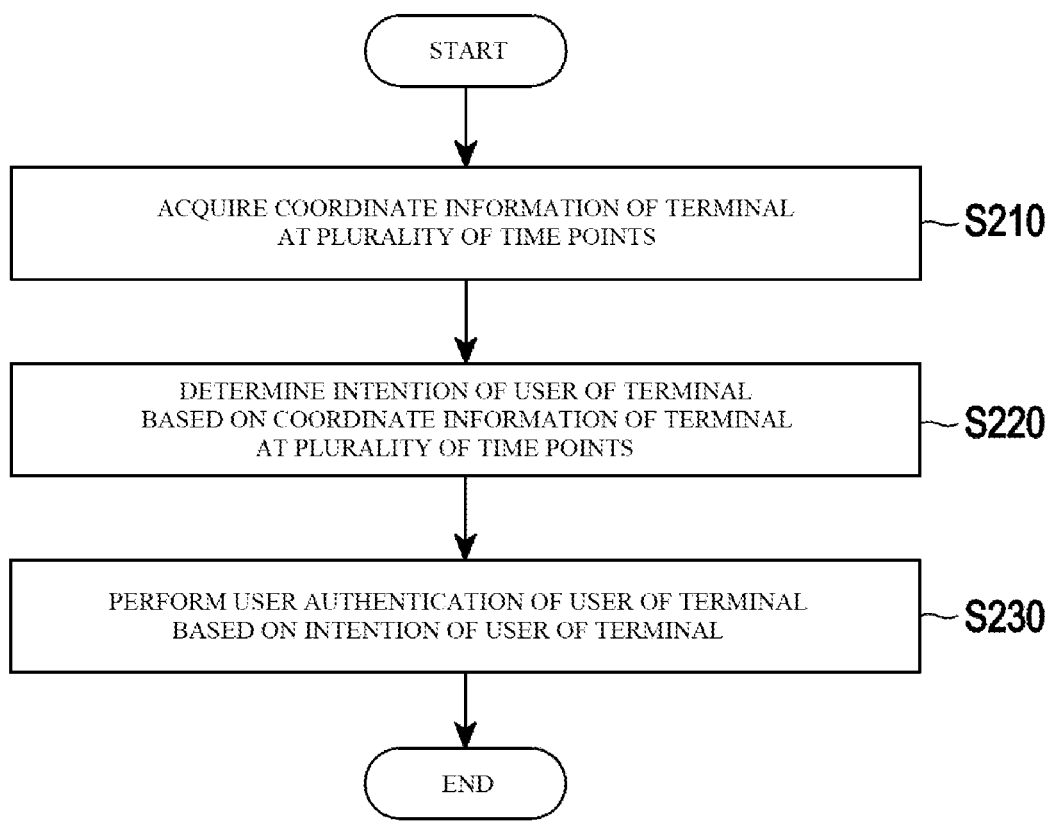
FIG. 12 is an operation flowchart illustrating a user authentication method of a control module according to an exemplary embodiment.

FIG. 12 is an operation flowchart illustrating a user authentication method of a control module according to an exemplary embodiment.

Referring to FIG. 12, the user authentication method of a control module may include operation S210 of acquiring coordinate information of a terminal at a plurality of time points, operation S220 of determining an intention of a user of the terminal based on the coordinate information of the terminal corresponding to the plurality of time points, and operation S230 of performing authentication of the user of terminal based on the intention of the user of terminal.

According to an exemplary embodiment, the control module may be included in the terminal, the control device, or the server. Also, the positioning module and control module described above may be one unit or separate.

In operation S210, the control module may acquire the coordinate information of the terminal from the above-described positioning module at the plurality of time points. Here, the control module may acquire coordinate information of a location-recognized device and coordinate information of a location-unrecognized device together or acquire the above-described final map information. This has been described above with reference to FIGS. 6 to 10, and thus detailed description thereof will be omitted.

Also, the control module may acquire not only the coordinate information of the terminal but also time information corresponding to the coordinate information. As an example, when the positioning module acquires coordinate information of a first location at a first time point and acquires coordinate information of a second location at a second time point, the control module may acquire information on the first time point together with the coordinate information of the first location and acquire information on the second time point together with the coordinate information of the second location from the positioning module. As another example, when the control module receives coordinate information of a first location and coordinate information of a second location from the positioning module but does not receive a first time point at which the coordinate information of the first location is acquired from the positioning module or a second time point at which the coordinate information of the second location is acquired from the positioning module, the control module may acquire, as the time information, information on a time at which the coordinate information of the first location is received and information on a time at which the coordinate information of the second location is received from the positioning module. As still another example, when the control module receives coordinate information of a first location from the positioning module, does not receive information on a first time point at which the coordinate information of the first location is acquired by the positioning module, and receives coordinate information of a third location from another terminal together with information on a third time point at which the coordinate information of the third location is acquired by the other terminal, the control module may acquire the third time point as time information corresponding to the coordinate information of the first location.

In operation S220, the control module may determine the intention of the user of terminal based on the coordinate information of the terminal corresponding to the plurality of time points and/or time information corresponding to the coordinate information. Here, the intention of the user of terminal may be one of various intentions such as an intention to access a certain security zone, an intention to pay for a certain service, an intention to user a certain device, an intention to control an operating mode of a certain device, etc.

According to an exemplary embodiment, the control module may determine whether the terminal is in a certain security zone or within a certain distance from a certain device using the coordinate information of the terminal corresponding to the plurality of time points.

Also, the control module may determine at least one piece of movement information among the terminal's movement, movement speed, and movement angle, and the user's walking pattern at the plurality of time points based on the coordinate information of the terminal corresponding to the plurality of time points. The control module may determine the intention of the user based on the at least one piece of movement information. For example, the control module may determine the terminal's movement and movement speed based on the coordinate information of the terminal corresponding to the plurality of time points and the time information corresponding to the coordinate information. In this case, when the terminal's movement approaches the certain security zone (i.e., the terminal comes within a predetermined distance from the certain security zone) and then stays around the certain security zone and the terminal's movement speed is gradually reduced, the control module may determine that the user of terminal has an intention to access the certain security zone. Also, when the terminal's movement approaches the certain security zone (i.e., the terminal comes within a predetermined distance from the certain security zone) and then moves away from the certain security zone, the control module may determine that the user of terminal has no intention to access the certain security zone.

In operation S230, the control module may perform user authentication of the user of terminal based on the intention of the user of terminal. Here, the user authentication may be classified by the intention of the user of terminal. For example, when the intention of the user of terminal is to access the certain security zone, the control module may perform access authority authentication regarding whether the user or the terminal has authority to access the specific area as user authentication. When the intention of the user of terminal is to pay for a certain service, the control module may perform payment authority authentication regarding whether the user or terminal has authority to process payment for the certain service as user authentication. When the intention of the user of terminal is to use a certain device, the control module may perform usage authority authentication regarding whether the user or terminal has authority to use the specific device as user authentication. When the intention of the user of terminal is to control an operating mode of a certain device, the control module may perform operating mode setting authentication regarding whether the user or terminal has authority to set the operating mode of the certain device as user authentication.

When the intention of the user is not determined or the user has no intention to access a certain zone, pay for a service, use a certain device, or control an operating mode of a certain device, the control module may not perform user authentication.

As described above, the control module may be included in the terminal, the control device, or the server. Since the description of FIG. 1 may be applied to user authentication performed when the control module is included in each device, detailed description thereof will be omitted.

According to the present application, even when coordinate information of a location-unrecognized device is unknown, it is possible to accurately find coordinate information of the location-unrecognized device and the coordinate information of a terminal through communication between the terminal and a location-recognized device and communication between the terminal and the location-unrecognized device.

According to the present application, it is possible to perform user authentication by accurately finding an intention of a user of a terminal using coordinate information of a location-unrecognized device and coordinate information of the terminal.

Effects of the present application are not limited to those described above, and other effects which have not been described will be clearly understood by those of ordinary skill in the art from the present specification and the accompanying drawings.

Although the present invention has been described above with reference to limited embodiments and drawings, those of ordinary skill in the art can make various modifications and alterations from the above description. For example, even when the described techniques are performed in a different order from that of a described method and/or described components, such as a system, a structure, a device, a circuit, etc., are coupled or combined in a different form from that of a described method or replaced by other components or equivalents thereto, appropriate results can be achieved.

Therefore, other implementations, other embodiments, and equivalents to the claims fall within the scope of the following claims.

What is claimed is:

1. A positioning method of a positioning module for measuring a location of at least one location-unrecognized device and a location of a terminal, wherein the at least one location-unrecognized device, the terminal and at least one location-recognized device are located in a certain zone, and wherein the positioning module has coordinate information of the at least one location-recognized device and the positioning module does not have coordinate information of the at least one location-unrecognized device, the positioning method comprising:

acquiring coordinate information of the terminal which includes coordinate information at a first location, coordinate information at a second location, and coordinate information at a third location, based on signals transmitted and received between the at least one location-recognized device and the terminal;

acquiring first distance information between the terminal at the first location and the at least one location-unrecognized device and generating a first virtual circle based on the first distance information;

acquiring second distance information between the terminal at the second location and the at least one location-unrecognized device and generating a second virtual circle based on the second distance information;

acquiring third distance information between the terminal at the third location and the at least one location-unrecognized device and generating a third virtual circle based on the third distance information; and estimating the coordinate information of the at least one location-unrecognized device based on the coordinate information of the terminal, the first virtual circle, the second virtual circle, and the third virtual circle.

2. The positioning method of claim 1, wherein the acquiring of the coordinate information of the terminal comprises:

acquiring the coordinate information of the at least one location-recognized device;

acquiring distance information between the terminal at the first location and the at least one location-recognized device, distance information between the terminal at the second location and the at least one location-recognized device, and distance information between the terminal at the third location and the at least one location-recognized device; and estimating coordinate information of the first location, coordinate information of the second location, and coordinate information of the third location based on the coordinate information of the at least one location-recognized device, the distance information between the terminal at the first location and the at least one location-recognized device, the distance information between the terminal at the second location and the at least one location-recognized device, and the distance information between the terminal at the third location and the at least one location-recognized device.

3. The positioning method of claim 2, wherein the acquiring of the distance information between the terminal at the first location and the at least one location-recognized device, the distance information between the terminal at the second location and the at least one location-recognized device, and the distance information between the terminal at the third location and the at least one location-recognized device comprises:
- calculating distance information between the terminal at the first location and at least three of the at least one location-recognized device based on information on times at which the terminal at the first location transmits a signal to the at least three location-recognized devices and information on times at which the terminal at the first location receives signals from the at least three location-recognized devices;
- calculating distance information between the terminal at the second location and at least three of the at least one location-recognized device based on information on times at which the terminal at the second location transmits a signal to the at least three location-recognized devices and information on times at which the terminal at the second location receives signals from the at least three location-recognized devices; and
- calculating distance information between the terminal at the third location and at least three of the at least one location-recognized device based on information on times at which the terminal at the third location transmits a signal to the at least three location-recognized devices and information on times at which the terminal at the third location receives signals from the at least three location-recognized devices.

4. The positioning method of claim 2, wherein the estimating of the coordinate information of the first location, the coordinate information of the second location, and the coordinate information of the third location based on the coordinate information of the at least one location-recognized device, the distance information between the terminal at the first location and the at least one location-recognized device, the distance information between the terminal at the second location and the at least one location-recognized device, and the distance information between the terminal at the third location and the at least one location-recognized device comprises:
- acquiring angle information between the terminal at the first location and the at least one location-recognized device based on a signal received from the at least one location-recognized device by the terminal at the first location and calculating the coordinate information of the first location based on the angle information between the terminal at the first location and the at least one location-recognized device, the coordinate information of the at least one location-recognized device, and the distance information between the terminal at the first location and the at least one location-recognized device;
- acquiring angle information between the terminal at the second location and the at least one location-recognized device based on a signal received from the at least one location-recognized device by the terminal at the second location and calculating the coordinate information of the second location based on the angle information between the terminal at the second location and the at least one location-recognized device, the coordinate information of the at least one location-recognized device, and the distance information between the terminal at the second location and the at least one location-recognized device; and
- acquiring angle information between the terminal at the third location and the at least one location-recognized device based on a signal received from the at least one location-recognized device by the terminal at the third location and calculating the coordinate information of the third location based on the angle information between the terminal at the third location and the at least one location-recognized device, the coordinate information of the at least one location-recognized device, and the distance information between the terminal at the third location and the at least one location-recognized device.

5. The positioning method of claim 1, wherein the estimating of the coordinate information of the at least one location-unrecognized device comprises:
- determining a first location-unrecognized device which is present in common on the first virtual circle, the second virtual circle, and the third virtual circle, among the at least one location-unrecognized device; and
- estimating coordinate information of the first location-unrecognized device based on the coordinate information of the terminal, a radius of the first virtual circle, a radius of the second virtual circle, and a radius of the third virtual circle.

6. The positioning method of claim 2, wherein the generating of the first virtual circle comprises calculating the first distance information between the terminal at the first location and the at least one location-unrecognized device based on information on a time at which the terminal at the first location transmits a signal to the at least one location-unrecognized device and information on a time at which the terminal at the first location receives a signal from the at least one location-unrecognized device,
- the generating of the second virtual circle comprises calculating the second distance information between the terminal at the second location and the at least one location-unrecognized device based on information on a time at which the terminal at the second location transmits a signal to the at least one location-unrecognized device and information on a time at which the terminal at the second location receives a signal from the at least one location-unrecognized device, and
- the generating of the third virtual circle comprises calculating the third distance information between the terminal at the third location and the at least one location-unrecognized device based on information on a time at which the terminal at the third location transmits a signal to the at least one location-unrecognized device and information on a time at which the terminal at the third location receives a signal from the at least one location-unrecognized device.

7. The positioning method of claim 1, wherein each of the first virtual circle, the second virtual circle, and the third virtual circle includes a plurality of virtual circles.

8. The positioning method of claim 1, wherein the at least one location-recognized device and the at least one location-unrecognized device do not communicate with each other.

9. The positioning method of claim 5, wherein the estimating of the coordinate information of the first location-unrecognized device comprises estimating the coordinate information of the first location-unrecognized device using triangulation based on the coordinate information of the terminal, the radius of the first virtual circle, the radius of the second virtual circle, and the radius of the third virtual circle.

10. The positioning method of claim 1, wherein the terminal transmits and receives signals with the at least one location-recognized device and the at least one location-unrecognized device using an ultra-wide band (UWB) communication protocol.

11. The positioning method of claim 1, further comprising generating map information using the coordinate information of the at least one location-recognized device, the coordinate information of the at least one location-unrecognized device, and the coordinate information of the terminal.

12. The positioning method of claim 1, further comprising:
- when the coordinate information of the at least one location-unrecognized device is estimated, acquiring the coordinate information of the terminal in real time using signals transmitted and received between the terminal and the at least one location-recognized device and signals transmitted and received between the terminal and the at least one location-unrecognized device;
- determining an intention of a user of the terminal based on the coordinate information of the terminal acquired in real time; and
- performing user authentication of the user of terminal based on the intention of the user of terminal.

13. The positioning method of claim 1, wherein the positioning module is included in at least one of the terminal, a server communicating with the terminal, and a control device communicating with the terminal.

14. A non-transitory computer-readable recording medium having recorded thereon a program for performing the method of claim 1.

* * * * *